United States Patent
Hodgins (10) Patent No.: US 9,258,142 B2
(45) Date of Patent: Feb. 9, 2016

(54) MESSAGE SYSTEM FOR SOCIAL NETWORKS

(75) Inventor: Christopher L. Hodgins, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/147,834

(22) PCT Filed: Jan. 25, 2010

(86) PCT No.: PCT/EP2010/050783
§ 371 (c)(1),
(2), (4) Date: Aug. 4, 2011

(87) PCT Pub. No.: WO2010/089216
PCT Pub. Date: Aug. 12, 2010

(65) Prior Publication Data
US 2011/0295964 A1 Dec. 1, 2011

(30) Foreign Application Priority Data
Feb. 5, 2009 (EP) ..................... 09152101

(51) Int. Cl.
G06F 15/16 (2006.01)
H04L 12/58 (2006.01)

(52) U.S. Cl.
CPC ..................... *H04L 12/58* (2013.01)

(58) Field of Classification Search
CPC ..... H04L 51/16; H04L 12/586; H04L 12/581; H04L 51/04; H04L 29/06; G06F 2221/2151
USPC .......................................... 709/206
See application file for complete search history.

(56) References Cited

U.S. PATENT DOCUMENTS 8,346,864 B1 * 1/2013 Amidon et al. ............... 709/204
8,413,060 B1 4/2013 Agrawal
(Continued)

FOREIGN PATENT DOCUMENTS

CN 1482558 A 3/2004
CN 101262494 A 9/2008
(Continued)

OTHER PUBLICATIONS

Bojars, U., et al., "Interlinking the Social Web with Semantics," IEEE Intelligent Systems, IEEE US, vol. 23, No. 3, May 1, 2008, pp. 29-40.
(Continued)

*Primary Examiner* — Kevin Bates
*Assistant Examiner* — Sm Rahman
(74) *Attorney, Agent, or Firm* — Cuenot, Forsythe & Kim, LLC (57) ABSTRACT

A method of operating a message system can include maintaining a list of users of the message system and maintaining a connection list and a message stream for each user of the message system. After receiving a message from a first user of the message system, the received message can be published on the message stream of the first user and on the message streams of the users identified in the first user's connection list. If the received message is detected to be a reply to an earlier message from a second user, then the earlier message can be published on the message streams of the users identified in the first user's connection list, who are not in the second user's connection list.

12 Claims, 6 Drawing Sheets

(56) References Cited

U.S. PATENT DOCUMENTS

| | | | |
|---|---|---|---|
| 8,676,901 B1* | 3/2014 | Nicolaou | H04L 51/08 709/203 |
| 2003/0177194 A1 | 9/2003 | Crocker et al. | |
| 2004/0019637 A1 | 1/2004 | Goodman et al. | |
| 2005/0101338 A1* | 5/2005 | Kraft | 455/466 |
| 2005/0235062 A1 | 10/2005 | Lunt et al. | |
| 2006/0123092 A1 | 6/2006 | Madams et al. | |
| 2008/0046512 A1 | 2/2008 | Jones et al. | |
| 2008/0147810 A1* | 6/2008 | Kumar | H04L 67/38 709/206 |
| 2009/0006566 A1 | 1/2009 | Veeramachaneni et al. | |
| 2009/0094288 A1 | 4/2009 | Berry et al. | |
| 2009/0113006 A1 | 4/2009 | McWana | |
| 2009/0113452 A1 | 4/2009 | Grigsby et al. | 719/318 |
| 2009/0125596 A1 | 5/2009 | Naick et al. | |
| 2012/0203855 A1 | 8/2012 | Hodgins | |
| 2014/0330909 A1* | 11/2014 | Cleaver | G06Q 10/101 709/205 |
| 2015/0201062 A1* | 7/2015 | Shih | H04M 1/72552 455/564 |

FOREIGN PATENT DOCUMENTS

| | | |
|---|---|---|
| CN | 102292945 B | 4/2014 |
| EP | 2342874 A1 | 4/2011 |
| JP | 2008-226143 A | 9/2008 |
| JP | 2012517056 A | 7/2012 |
| KR | 20110127672 A | 11/2011 |
| WO | 2008084207 A1 | 7/2008 |
| WO | 2010089216 A1 | 8/2010 |

OTHER PUBLICATIONS

Honeycutt, C., et al., "Beyond Microblogging: Conversation and Collaboration via Twitter," HICSS '09, 42nd Hawaii Int'l. Conf. on System Sciences, IEEE, Jan. 5, 2009, pp. 1-10.

U.S. Appl. No. 13/453,014, Non-Final Office Action, Aug. 30, 2013, 11 pg.

WIPO Appln. No. PCT/EP2010/050783, Int'l. Search Report and Written Opinion, Apr. 29, 2010, 11 pg.

U.S. Appl. No. 13/453,014, Final Office Action, Mar. 25, 2014, 12 pg.

\* cited by examiner

| BILL'S CONNECTIONS | JOHN'S CONNECTIONS |
|---|---|
| JOHN | BILL |
| DAVID | GEORGE |

| @bill's stream |
|---|
| 17.38 Bill: Glad to be heading home… what a busy day. |
| 15.11 Bill: @david Oh look forward to finding out more! |
| 14.59 David: @bill can't say anything yet but it's going to be big. |
| 13.43 Bill: @john Have fun, great weather for it. |
| 13.40 John: Planning a trip to the zoo with the family. |
| 12.01 Bill: So much to do today. |
| 11.22 Bill: @david Working on anything new? |

— 22 (top row), — 20

| @john's stream |
|---|
| 17.38 Bill: Glad to be heading home… what a busy day. |
| 15.11 Bill: @david Oh look forward to finding out more! |
| 13.43 Bill: @john Have fun, great weather for it. |
| 13.40 John: Planning a trip to the zoo with the family. |
| 12.01 Bill: So much to do today. |
| 11.22 Bill: @david Working on anything new? |
| 11.01 George: On education today. |

| @bill's stream |
|---|
| 17.38 Bill: Glad to be heading home… what a busy day. |
| 15.11 Bill: @david Oh look forward to finding out more! |
| 14.59 David: @bill can't say anything yet but it's going to be big. |
| 13.43 Bill: @john Have fun, great weather for it. |
| 13.40 John: Planning a trip to the zoo with the family. |
| 12.01 Bill: So much to do today. |
| 11.22 Bill: @david Working on anything new? |

| @john's stream |
|---|
| 17.38 Bill: Glad to be heading home… what a busy day. |
| 15.11 Bill: @david Oh look forward to finding out more! |
| 14.59 David: @bill can't say anything yet but it's going to be big. |
| 13.43 Bill: @john Have fun, great weather for it. |
| 13.40 John: Planning a trip to the zoo with the family. |
| 12.01 Bill: So much to do today. |
| 11.22 Bill: @david Working on anything new? |
| 11.01 George: On education today. |

Fig. 6

MESSAGE SYSTEM FOR SOCIAL NETWORKS

CROSS-REFERENCE TO RELATED APPLICATIONS

This application is the national stage of PCT/EP2010/050783 filed 25 Jan. 2010, designating, inter alia, the United States and claiming priority to European Patent Application No. 09152101.3 filed 5 Feb. 2009, each of which is hereby incorporated by reference.

BACKGROUND

This invention relates to a message system, and to a method of operating a message system.

The publication of information by private individuals using the Internet is now increasingly common. One example of such a publication is known as a biog. A blog is a website, usually maintained by an individual, with regular entries of commentary and descriptions of events, or other material such as graphics or video. Entries are commonly displayed reverse-chronological order. Many blogs provide commentary on a particular topic, while others function as personal online diaries. A typical blog may combine text, images, and links to other web pages. Micro-blogging is a type of blogging, which consists of Hogs with very short posts.

An example of such a micro-blogging service is Twitter http://twitter.com), which is a free social networking and micro-blogging service that allows its users to send and read other users' updates (otherwise known as tweets), which are text-based posts of up to 140 characters in length. Updates are displayed on the user's profile page and delivered to other users who have signed up to receive them. Twitter and other similar variants allow users to build up a list of other users of whom they would like to keep track. Occasionally, one of a users connected "friends" may reply to another user who is not in the user's list of friends, thus leaving some conversations out of the reach of the user without further research.

BRIEF SUMMARY

According to a first aspect of the present invention, there is provided a method of operating a message system including maintaining a list of users of the message system, maintaining a connection list and a message stream for each user of the message system, receiving a message from a first user of the message system, publishing the received message on the message stream of the first user, publishing the received message on the message streams of the users identified in the first user's connection list, detecting that the received message is a reply to an earlier message from a second user, and publishing the earlier message on the message streams of the users identified in the first user's connection list, who are not in the second user's connection list.

According to a second aspect of the present invention, there is provided a message system that can include a server connected to a plurality of client devices and arranged to maintain a list of users of the message system, maintain a connection list and a message stream for each user of the message system, receive a message from a first user of the message system, publish the received message on the message stream of the first user, publish the received message on the message streams of the users identified in the first user's connection list, detect that the received message is a reply to an earlier message from a second user, and to publish the earlier message on the message streams of the users identified in the first user's connection list, who are not in the second user's connection list.

According to a third aspect of the present invention, there is provided a computer program product on a computer readable medium for operating a message system, the product can include instructions for maintaining a list of users of the message system, maintaining a connection list and a message stream for each user of the message system, receiving a message from a first user of the message system, publishing the received message on the message stream of the first user, publishing the received message on the message streams of the users identified in the first user's connection list, detecting that the received message is a reply to an earlier message from a second user, and publishing the earlier message on the message streams of the users identified in the first user's connection list, who are not in the second user's connection list.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
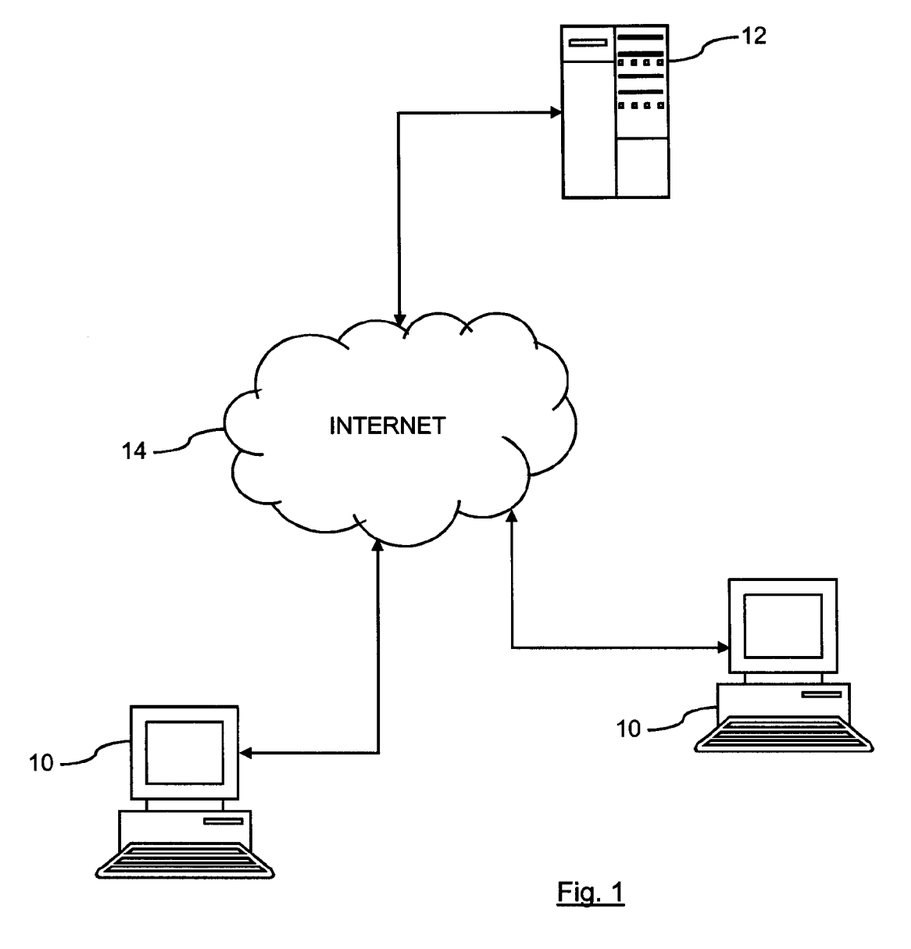
FIG. 1 is a schematic diagram of a message system.

A message system is shown in FIG. 1, which comprises a plurality of client devices 10 connected to a server 12 via a network 14. The network could be a wide area network such as the Internet, or could be an internal network with an organisation, for example. The server 12 is running software that maintains the messaging service, and the client devices 10 connect to the server 12 in order to participate in the messaging system. The client devices 10 and the server 12 are in two-way communication via the network 14. For simplicity of explanation, only two client devices 10 are shown, whereas in reality a very large number of different client devices 10 can be connected to the server 12 at any one time. The client devices 10 are here shown as desktop computers, but can be any suitable device with a necessary connection and sufficient processing capability, such as a mobile phone, laptop or handheld computer.

In the example of FIG. 1, the network 14 is the Internet, which means that the message service provided by the server is available to any user with an Internet connection. Effectively, the server 12 is running a web service through a website. The server 12 is shown as a single device, but may comprise more than one device, with the functionality distributed amongst the different devices. To participate in the service offered by the server 12, the users must connect to the website and register as a user. Once an individual is registered with the service run by the server 12, then they can connect to the server 12 at any time and use the message service. The service provided by the server 12 is a micro-blogging service, which allows each user to publish one or more messages on their own micro-blog. Users can also subscribe to other people's micro-blogs. If a first user is subscribed to a second user's micro-blog, then the first user will also have published on their micro-blog any of the second user's messages published on the second user's micro-biog.

The server 12, in order to operate the message system, must maintain certain information about each of the individual users who are registered with the service, in order for the service to function effectively. For example, it is necessary for the server 12 to maintain a list of the users of the message system and also maintain a connection list and a message stream (the micro-blog) for each user of the message system. The connection list for a specific user defines those users who are connected to the specific user, and will therefore have published on their own message streams the messages published by the specific user. Normally, the connection between two users has to be agreed between them in a formal process.

Figure 2A:
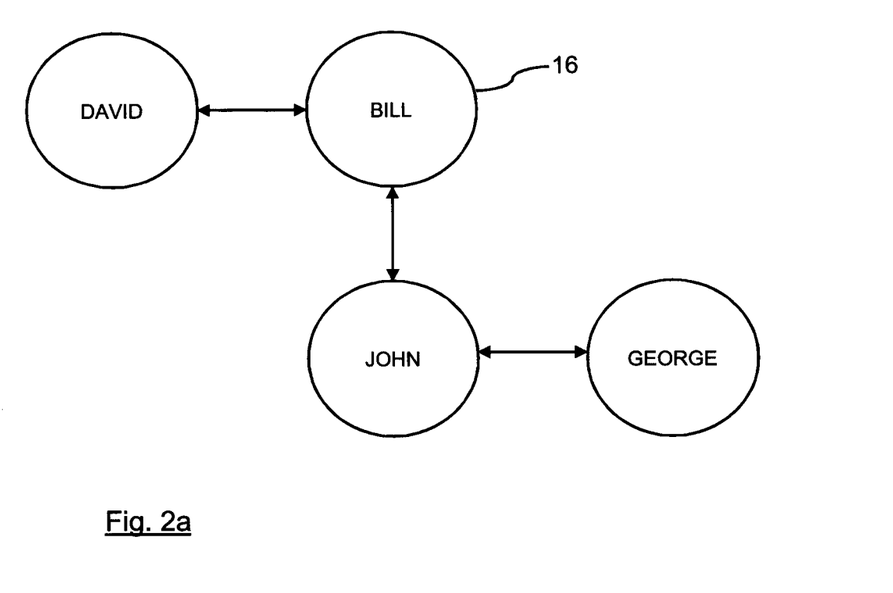
FIGS. 2a and 2b are schematic diagrams of connections in a message system.

FIG. 2a illustrates a connection diagram showing four users, David, Bill, John and George. Each user 16 is shown as a circle. The connection by an arrow to another user 16 illustrates where two users 16 are connected within the message system. The messaging system maintains a search function which allows users 16 to search for each other, and when a user 16 wishes to connect to another user they will make a connection request which is then passed to that other user. Once the other user has accepted the request, then the connection between the two users is established. FIG. 2a shows a visualisation of the connections for the purpose of understanding the principle; data would not actually be stored in this format.

Figure 2B:
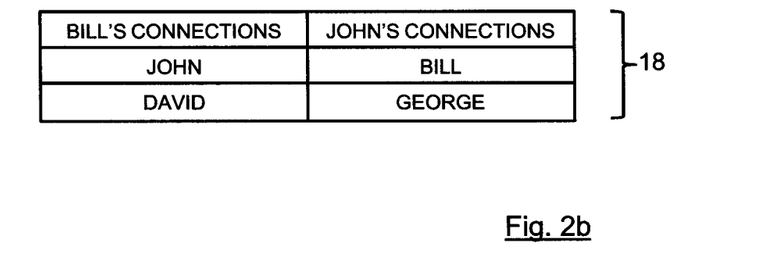

FIG. 2b shows a table which includes two connections lists 18 for two of the users, Bill and John, illustrated in FIG. 2a. Bill's connections are to John and David, and the connection list 18 for Bill lists those two users 16. John's connections are to Bill and George and they are shown in John's connection list 18. Depending upon the construction of the message system being run by the server 12, connections could be two-way or one-way or either could be supported. In terms of a micro-blogging message system a one-way connection would mean that messages published on a first message stream would automatically be published on the connected user's message stream, but not vice versa. This can be seen to be the difference between following someone else's message stream and having a follower to your own message stream.

Figure 3:
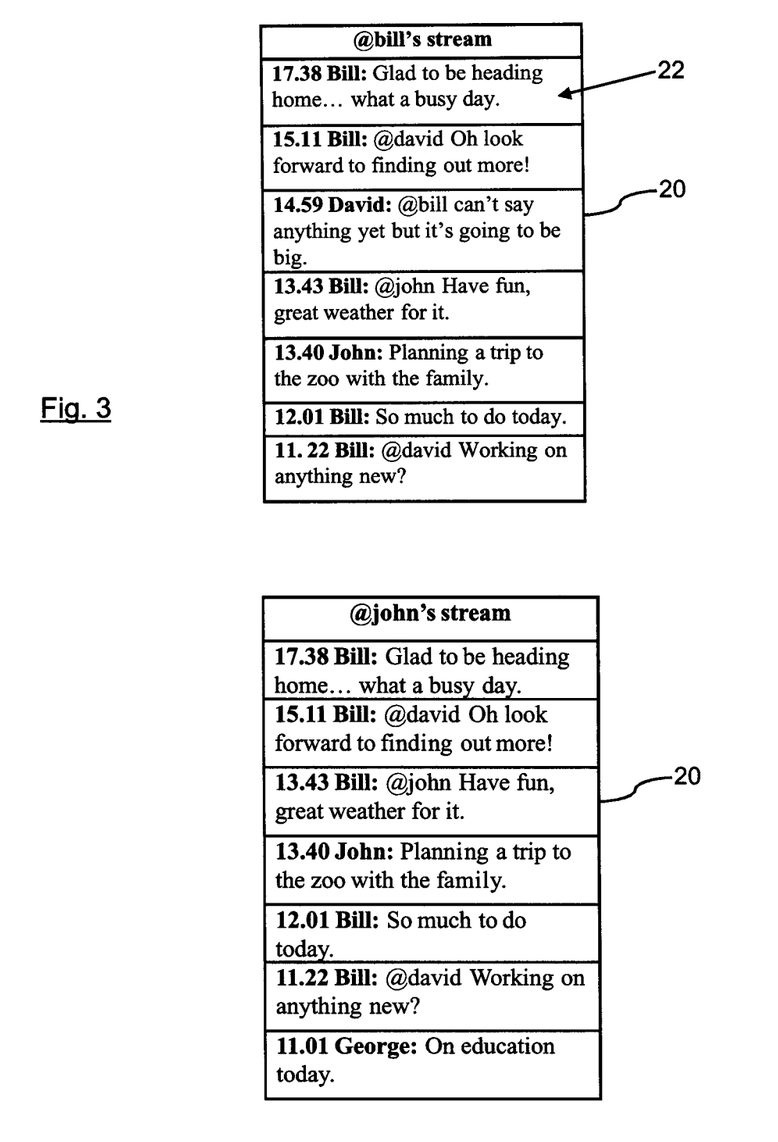
FIG. 3 is a schematic diagram of a pair of message streams.

An example of the output as presented to a user of the message system is illustrated in FIG. 3, which shows two example message streams 20 for the users Bill and John of FIG. 2. Depending upon the configuration of the message system and of the individual user's preferences, these message streams 20 may be freely available for viewing by any user of the system, or may only be viewed by the actual connected users to the respective user. Although the two message streams 20 are both shown together, typically a user will only be able to see one message stream 20 at a time, and can navigate between message streams 20 according to the structure of the user interface of the message system.

A message stream 20 is made up of messages 22. Each message 22 includes the time of publication, the name of the user 16 who made the publication and the content of the message 22. In many micro-blogging message systems, the size of the message 22 is limited, for example to 140 characters, although there is nothing to stop a user 16 from posting multiple messages 22. The messages 22 are ordered such that the most recently posted message 22 is found at the top of the message stream 20. As each new message 22 is written and posted, then that new message 22 will be published at the top, and the older messages will move down the page.

Each user 16 effectively posts on their own message stream 20, and the message 22 that is posted by the user on their own stream 20 is then published on all of the message streams 20 identified in the user's connection list 18. This can be seen in FIG. 3, where, for example, John published a message 22 at time 13.40, shown in their own message stream 20, which is then also published on Bill's stream 20, as Bill is a user 16 who is connected to John. Similarly, all of the messages that Bill has posted on his stream 20 have also been published on John's stream. However, user David publishing a message on his stream 20 will cause that message 22 to be published on Bill's stream 20, as Bill is connected to David, but the message 22 is not published on John's stream 20, as John in not connected to David (see FIG. 2a).

Figure 4:
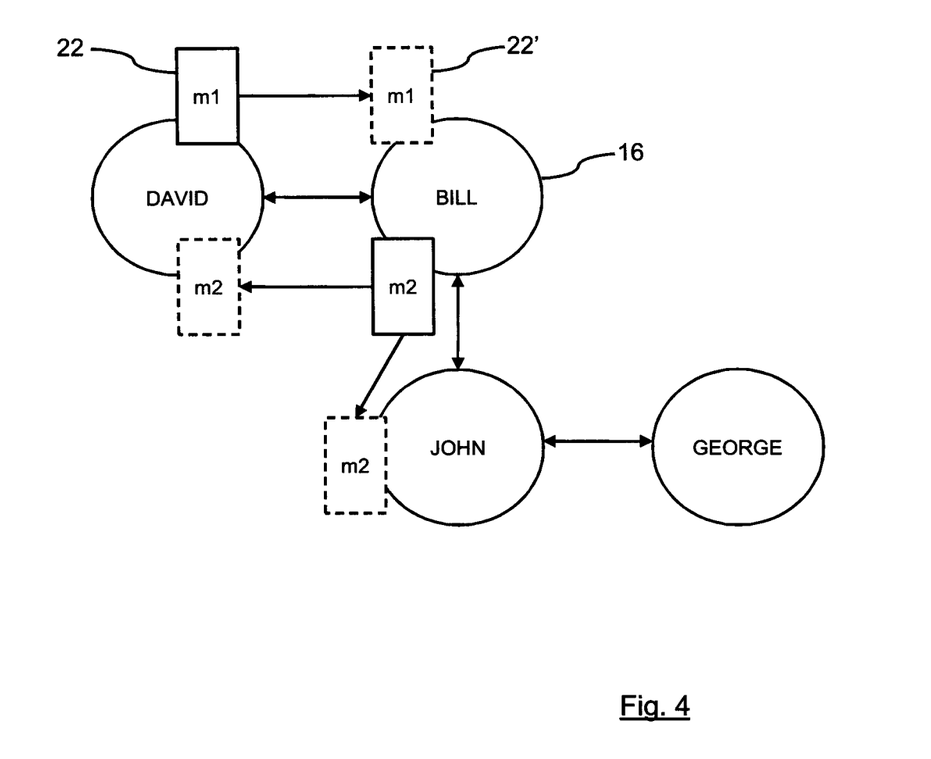
FIG. 4 is a schematic diagram of connections in a message system showing message flow.

The problem with the operation of such a message system is shown in FIG. 4. When David creates a message 22 this is published on his stream 20, and this message (as 22' in the Figure) is also published on Bill's stream 20, because Bill is a user 16 connected to David (as detailed in David's connection list 18). When Bill replies to this message 22 with his own message 22, then this new message 22 is published on Bill's stream 20 and on David's stream 20. However this message 22 is also published on John's message stream 20, as he is also a user 16 connected to Bill. Yet Bill does not know what this reply message 22 is about.

The following describes the existing flow of messages 22, from the point of view of John. An unconnected user (David) updates his conversation at time T+0. A connected user (Bill) replies to the new item in the conversation at T+1. The user (John) only sees the connected user's reply (Bill's reply) to the unconnected user (David) but nothing else. John has no knowledge of the earlier message, and this can lead to a confusing and/or annoying situation with regard to the content of the user's message stream 20. There is a need to provide a mechanism that will overcome the problem of a connected user replying to message 22 that originated from a user who is unconnected.

The message system is enhanced to extending the social network with related conversations. This system solves the problem by detecting when a connected user replies to a user who is not connected and attaches the preceding conversation to the user's conversation list. The message flow would now be as follows, again from the point of view of John. The unconnected user (David) updates his conversation at time T+0. The connected user (Bill) replies to the new item in the conversation at T+1. The system detects that a connected user is replying to an unconnected user and injects the earlier message at T+0 into the message stream 20. The user (John) sees connected user's reply and the original unconnected user's message 22. This sequence can be applied repeatedly if the non-connected user's message 22 was in reply to another non-connected user, until the full conversation thread is complete.

Figure 5:
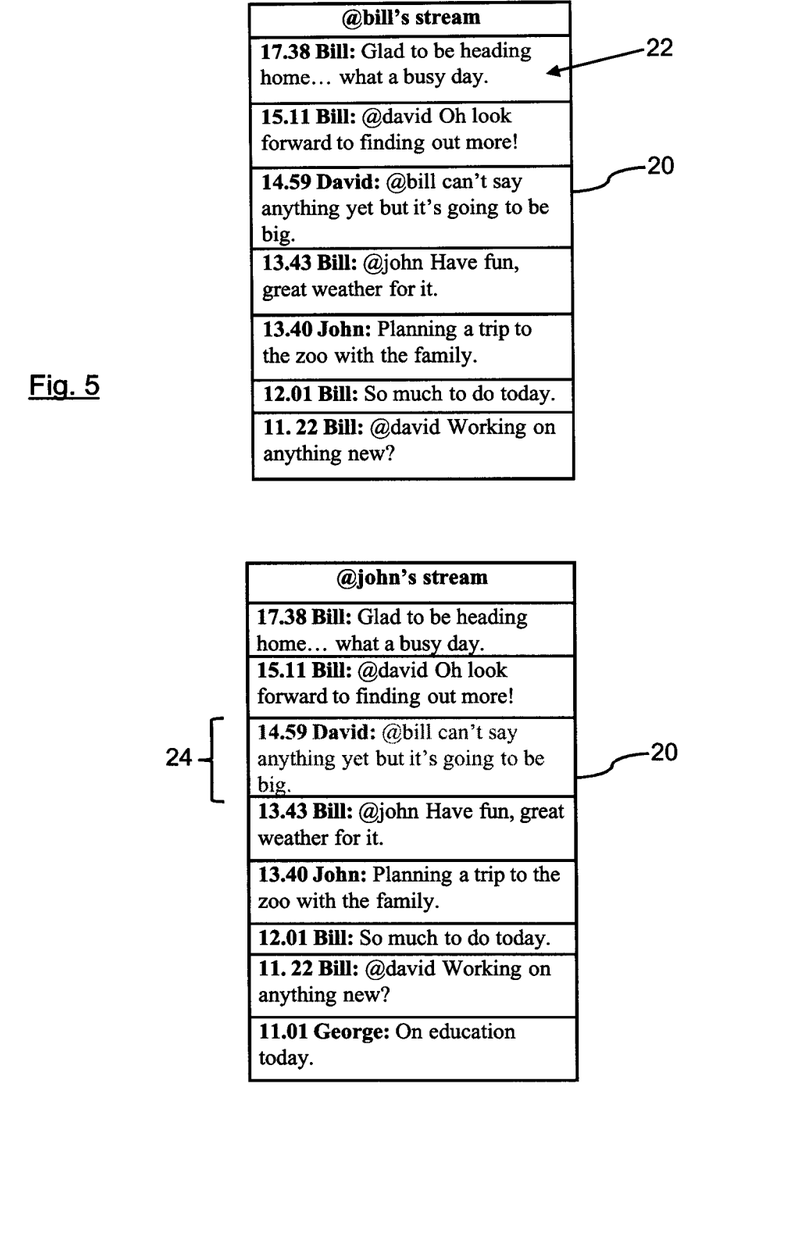
FIG. 5 is a further schematic diagram of a pair of message streams.

FIG. 5 shows how the message streams 20 of FIG. 3 would be changed by the implementation of the feature described above. Specifically, the 15.11 message published by Bill was a reply to the 14.59 message published by David. However, as discussed above, although John will see the 15.11 message from Bill, in a normal operation John would not see the earlier 14.59 message from David in his message stream 20, as John is not connected to David. Without the implementation of the improvement, all that John sees in his stream 20 is the message from Bill which is a reply that does not make sense without the earlier message.

The message stream 20 of John, shown in the lower half of FIG. 5, is however, amended to include the earlier message 24 published by David on his stream 20. This allows John to see the context of the reply message 22, which is made at 15.11 by Bill. Ideally, the inserting of the earlier message 24 in the message stream 20 is such that it is in the correct time position. The presentation of the new message 24 in the message stream 20 can also be enhanced by using a different colour to indicate to the user that the earlier message 24 has been inserted, which would not normally be present in the user's message stream 20.

The process of inserting the new message 24 into the message stream 20 is carried out automatically by the server 12, in response to a defined set of circumstances. The server 12 is arranged to recognise that the message 22 of Bill is a reply to the earlier message 24 of David. This can be achieved in a number of ways. For example, the user interface of the messaging service may include a "reply to" function which therefore explicitly labels the published message 22 as a reply to an earlier message 24. Other implicit techniques may be used, for example by identifying the use of a name in the earlier message 24, or by identifying the use of a specific nomenclature such as @name, as indicators that the later message 22 is a reply to the earlier message 24.

Figure 6:
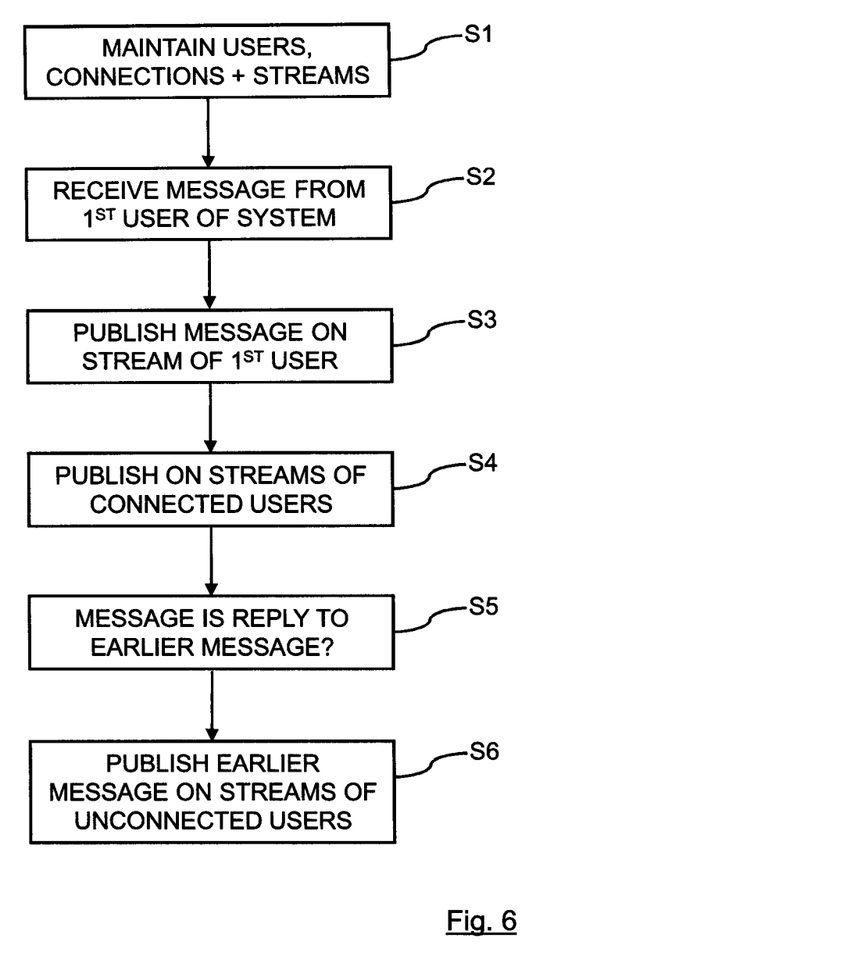
FIG. 6 is a flowchart of a method of operating the message system.

FIG. 6 summarises the methodology behind the implementation of the improved messaging system, from the point of view of the server 12. Although the above example of FIGS. 2 to 5 is described from the point of view of a single individual who is confused by the later message 20, in reality there will be multiple users who are not connected to the original user, who posted the earlier message 24, who will need to receive that earlier message 24. The method described with reference to FIG. 6 will catch all of the users who need to see the earlier message 24. Each user who is connected to the later user but not the earlier user needs to have their message stream 20 amended.

The method of operating the message system comprises, at step S1, maintaining a list of users 16 of the message system and maintaining a connection list 18 and a message stream 20 for each user 16 of the message system. At step S2 there is then the step of receiving a message 22 from a first user 16 of the message system, which results in the steps S3 of publishing the received message 22 on the message stream 20 of the first user 16 and step S4 of publishing the received message 22 on the message streams 20 of the users 16 identified in the first user's connection list 18.

Once this has been completed, there is carried out the step S5 of detecting that the received message 22 is a reply to an earlier message 25 from a second user 16, and at step S6 of publishing the earlier message 24 on the message streams 20 of the users 16 identified in the first user's connection list 18, who are not in the second user's connection list 18. In this way, all of the users 16 of the system who are not connected to the user 16 who posted the earlier message 24, but are connected to the user 16 who posted the reply 22 to the earlier message 24, will have that earlier message 24 published on their message stream 20.

According to a first aspect of the present invention, there is provided a method of operating a message system comprising maintaining a list of users of the message system, maintaining a connection list and a message stream for each user of the message system, receiving a message from a first user of the message system, publishing the received message on the message stream of the first user, publishing the received message on the message streams of the users identified in the first user's connection list, detecting that the received message is a reply to an earlier message from a second user, and publishing the earlier message on the message streams of the users identified in the first user's connection list, who are not in the second user's connection list.

According to a second aspect of the present invention, there is provided a message system comprising a plurality of client devices, and a server connected to the client devices and arranged to maintain a list of users of the message system, maintain a connection list and a message stream for each user of the message system, receive a message from a first user of the message system, publish the received message on the message stream of the first user, publish the received message on the message streams of the users identified in the first user's connection list, detect that the received message is a reply to an earlier message from a second user, and to publish the earlier message on the message streams of the users identified in the first user's connection list, who are not in the second user's connection list.

According to a third aspect of the present invention, there is provided a computer program product on a computer readable medium for operating a message system, the product comprising instructions for maintaining a list of users of the message system, maintaining a connection list and a message stream for each user of the message system, receiving a message from a first user of the message system, publishing the received message on the message stream of the first user, publishing the received message on the message streams of the users identified in the first user's connection list, detecting that the received message is a reply to an earlier message from a second user, and publishing the earlier message on the message streams of the users identified in the first user's connection list, who are not in the second user's connection list.

A message system can be provided that will automatically respond to the situation where a user receives a message on their message stream that is a response to an earlier message to which they do not have access. The messaging system can obtain the earlier message and add it to the user's message stream, so that the user does not have to either go through a laborious process to obtain the earlier message or actually remains unaware of the content of the earlier message.

Preferably, the method further can include detecting that the earlier message is a reply to a yet earlier message from a further user, and publishing the yet earlier message on the message streams of the users identified in the first user's connection list, who are not in the further user's connection list. The messaging system can be operated so that if the earlier message that is publishing on the message streams of the users identified in the first user's connection list, who are not in the second user's connection list, is in fact part of a longer conversation, then one or more further messages can also be posted to the message streams. This further assists the users in understanding the messages that are posted to their streams, when they refer back to messages to which they would not normally have access.

The step of detecting that the received message is a reply to an earlier message from a second user can include identifying the name of the second user in the received message. One method by which the received message can be identified as referring back to an earlier message is through reference to a specific user in the received message. This can be identified from the content of the message and allows the system to then carry out the step of identifying and publishing this earlier message to those users who would not normally see the message.

The step of publishing the earlier message on the message streams of the users identified in the first user's connection list, who are not in the second user's connection list, can include inserting the earlier message in the respective message streams in the correct time position. The presentation of the message stream to a user can be made consistent by inserting the earlier message in the users' respective streams at the correct location time-wise. The presentation of the message to the users in their message streams can also be enhanced by using a user interface technique (such as a different color) to indicate to the user that a message has been inserted, which would not normally be present in the user's message stream.

The method further can include generating a connection request between the second user and the users identified in the first user's connection list, who are not in the second user's connection list. The method of operating the message system can also be enhanced by generating an automatic connection request between the two users who are currently not connected. This will allow them to decide whether to become connected, thereby appearing in each other's connection list.

The invention claimed is:

1. A message system comprising:
    a server connected to a plurality of client devices and arranged to maintain a list of users of the message system, maintain a plurality of connection lists, the plurality of connection lists including a respective a connection list for each user of the message system, the respective connection list for each specific user defining those users who are connected to the specific user, maintain a message stream for each user of the message system, receive an electronic message from a first user of the message system, publish the received electronic message on the message stream of the first user, publish the received electronic message on the message streams of the users identified in the first user's connection list, detect that the received electronic message is a reply to an earlier electronic message from a second user of the message system and, responsive to detecting that the received electronic message is the reply to the earlier electronic message of the second user, to publish the earlier electronic message from the second user on the message streams of the users identified in the first user's connection list by inserting the earlier electronic message, as a stand-alone electronic message separate from the reply electronic message received from the first user, into the message streams of the users in a first time position that is prior to a second time position of the reply electronic message.

2. The message system according to claim 1, wherein the server is further arranged to detect that the earlier electronic message is a reply to a yet earlier electronic message from a further user of the message system and to publish the yet earlier electronic message on the message streams of the users identified in the first user's connection list, who are not in the further user's connection list.

3. The message system according to claim 1, wherein the server is arranged, when detecting that the received electronic message is a reply to an earlier electronic message from a second user, to identify the name of the second user in the received electronic message.

4. The message system according to claim 1, wherein inserting the earlier electronic message, as a stand-alone electronic message separate from the reply electronic message received from the first user, into the message streams of the users in a first time position that is prior to a second time position of the reply electronic message comprises inserting the earlier electronic message in the respective message streams in a correct time position with respect to the received electronic message replying to the earlier electronic message.

5. The message system according to claim 1, wherein the server is further arranged to generate a connection request between the second user and the users identified in the first user's connection list, who are not in the second user's connection list.

6. The message system according to claim 1, wherein the server is further configured to publish the earlier electronic message on the message streams of the users identified in the first user's connection list, who are not in the second user's connection list, by indicating that the earlier electronic message has been inserted and would not normally be present in the streams of the users identified in the first user's connection list by visually distinguishing the earlier electronic message within the streams of the users identified in the first user's connection list, who are not in the second user's connection list, from other messages.

7. A computer program product on a non-transitory computer readable medium for operating a message system, the product comprising instructions for:
    maintaining a list of users of the message system,
    maintaining a plurality of connection lists, the plurality of connection lists including a respective connection list for each user of the message system, the respective connection list for each specific user defining those users who are connected to the specific user,
    maintaining a message stream for each user of the message system,
    receiving an electronic message from a first user of the message system,
    publishing the received electronic message on the message stream of the first user,
    publishing the received electronic message on the message streams of the users identified in the first user's connection list,
    detecting that the received electronic message is a reply to an earlier electronic message from a second user of the message system, and
    responsive to detecting that the received electronic message is the reply to the earlier electronic message of the second user, publishing the earlier electronic message from the second user on the message streams of the users identified in the first user's connection list by inserting the earlier electronic message, as a stand-alone electronic message separate from the reply electronic message received from the first user, into the message streams of the users in a first time position that is prior to a second time position of the reply electronic message.

8. The computer program product according to claim 7, the computer program product further comprising instructions for detecting that the earlier electronic message is a reply to a yet earlier electronic message from a further user of the message system, and for publishing the yet earlier electronic message on the message streams of the users identified in the first user's connection list, who are not in the further user's connection list.

9. The computer program product according to claim 7, wherein the instructions for detecting that the received electronic message is a reply to an earlier electronic message from a second user comprise instructions for identifying the name of the second user in the received message.

10. The computer program product according to claim 7, wherein inserting the earlier electronic message, as a stand-alone electronic message separate from the reply electronic message received from the first user, into the message streams of the users in a first time position that is prior to a second time position of the reply electronic message comprises inserting the earlier electronic message in the respective message streams in a correct time position with respect to the received electronic message replying to the earlier electronic message.

11. The computer program product according to claim 7, further comprising instructions for generating a connection request between the second user and the users identified in the first user's connection list, who are not in the second user's connection list.

12. The computer program product according to claim 7, wherein publishing the earlier electronic message on the message streams of the users identified in the first user's connection list, who are not in the second user's connection list further comprises:
  indicating that the earlier electronic message has been inserted and would not normally be present in the streams of the users identified in the first user's connection list by visually distinguishing the earlier electronic message within the streams of the users identified in the first user's connection list, who are not in the second user's connection list, from other messages.

\* \* \* \* \*